(12) United States Patent
Bradley et al.

(10) Patent No.: US 12,373,831 B2
(45) Date of Patent: Jul. 29, 2025

(54) PAYMENT HANDOFF SYSTEM

(71) Applicant: Apple Inc., Cupertino, CA (US)

(72) Inventors: Bob Bradley, San Jose, CA (US); Marc J. Krochmal, Cupertino, CA (US); William M. Bumgarner, San Jose, CA (US); Vijay Sundaram, San Ramon, CA (US); Margaret A. Moore, San Jose, CA (US); Nicholas J. Shearer, San Francisco, CA (US); Brandon J. Kieft, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 17/473,993

(22) Filed: Sep. 13, 2021

(65) Prior Publication Data

US 2021/0406886 A1 Dec. 30, 2021

Related U.S. Application Data

(62) Division of application No. 15/922,795, filed on Mar. 15, 2018, now Pat. No. 11,120,445.

(Continued)

(51) Int. Cl.
*G06Q 20/40* (2012.01)
*G06Q 20/08* (2012.01)
(Continued)

(52) U.S. Cl.
CPC ......... *G06Q 20/40* (2013.01); *G06Q 20/0855* (2013.01); *G06Q 20/102* (2013.01);
(Continued)

(58) Field of Classification Search
CPC ........ G06Q 20/20; G06Q 20/32; G06Q 20/10; G06Q 20/40; G06Q 20/45; G06Q 20/24;
(Continued)

(56) References Cited

U.S. PATENT DOCUMENTS 7,729,996 B2 * 6/2010 Zito .................. G06Q 40/03
 705/40
8,571,985 B1 * 10/2013 Grigg ................ G06Q 20/36
 705/40

(Continued)

FOREIGN PATENT DOCUMENTS

CN 102289754 11/2011
GB 2514327 11/2014

(Continued)

OTHER PUBLICATIONS

H. Sun and M. Leu, "An Efficient Authentication Scheme for Access Control in Mobile Pay-TV Systems," Aug. 2009 in IEEE Transactions on Multimedia, vol. 11, No. 5, pp. 947-959. (Year: 2009).*

(Continued)

*Primary Examiner* — Hani M Kazimi
(74) *Attorney, Agent, or Firm* — BAKERHOSTETLER

(57) ABSTRACT

A device in a payment transaction handoff system may include at least one processor configured to receive a request to perform a payment transaction and identify, using a first communication protocol, a respective device identifier of each of a plurality of proximate devices. The at least one processor is configured to select, based at least in part on a payment factor, a default payment device from the plurality of proximate devices. The at least one processor is configured to transmit, via a second communication protocol, a message to perform the payment transaction, the message comprising the device identifier of the default payment device. In one or more implementations, a first device of the plurality of proximate devices may be associated with a first user account and a second device of the plurality of proximate devices may be associated with a second user account, different from the first user account.

20 Claims, 6 Drawing Sheets

Related U.S. Application Data

(60) Provisional application No. 62/472,167, filed on Mar. 16, 2017.

(51) Int. Cl.
  *G06Q 20/10* (2012.01)
  *G06Q 20/32* (2012.01)
  *G06Q 30/06* (2023.01)

(52) U.S. Cl.
  CPC ....... *G06Q 20/322* (2013.01); *G06Q 20/3224* (2013.01); *G06Q 20/3255* (2013.01); *G06Q 20/405* (2013.01); *G06Q 30/06* (2013.01)

(58) Field of Classification Search
  CPC ............... G06Q 20/102; G06Q 20/322; G06Q 20/3255; G06Q 30/02; G06Q 40/00
  USPC ............................ 705/16, 39, 40, 44, 17, 21
  See application file for complete search history.

(56) References Cited

U.S. PATENT DOCUMENTS

| | | | | |
|---|---|---|---|---|
| 9,400,978 | B2* | 7/2016 | Laracey | G06Q 30/06 |
| 2013/0218732 | A1* | 8/2013 | Hakim | G06Q 10/1053 |
| | | | | 705/317 |
| 2013/0246203 | A1* | 9/2013 | Laracey | G06Q 30/06 |
| | | | | 705/40 |
| 2013/0275286 | A1* | 10/2013 | Mattox | G06Q 40/06 |
| | | | | 705/37 |
| 2013/0282613 | A1* | 10/2013 | Mattox | G06Q 50/26 |
| | | | | 705/36 R |
| 2014/0258093 | A1* | 9/2014 | Gardiner | G06Q 40/03 |
| | | | | 705/38 |
| 2014/0324734 | A1* | 10/2014 | Mattox | G06Q 40/06 |
| | | | | 705/36 R |
| 2015/0046292 | A1* | 2/2015 | Zamer | G06Q 30/0629 |
| | | | | 705/26.64 |
| 2015/0095219 | A1* | 4/2015 | Hurley | G06Q 20/382 |
| | | | | 705/39 |
| 2016/0180320 | A1* | 6/2016 | Klingen | G06Q 20/425 |
| | | | | 705/44 |
| 2017/0186015 | A1* | 6/2017 | Jin | G06Q 20/308 |
| 2018/0268387 | A1* | 9/2018 | Bradley | G06Q 20/322 |

FOREIGN PATENT DOCUMENTS

| | | | |
|---|---|---|---|
| KR | 20160119725 | 10/2016 | |
| WO | WO 2018/169686 | 9/2018 | |
| WO | WO-2018169686 A1 * | 9/2018 | ........... G06Q 20/322 |

OTHER PUBLICATIONS

Decision from Great Britain Patent Application No. 1912496.5, dated Dec. 9, 2022, 11 pages.
Great Britain Office Action from Application No. GB1912496.5, dated Oct. 28, 2021, 4 pages.
Korean Office Action from Korean Application No. 10-2019-7025603, dated Nov. 1, 2021, 9 pages including English language translation.
Korean Office Action from Korean Patent Application No. 10-2021-7039670, dated Jan. 11, 2022, 14 pages including machine-generated English language translation.
Chinese Office Action from Chinese Patent Application No. 201880015489.6, dated Mar. 4, 2022, 9 pages including machine-generated English language translation.
United Kingdom Office Action from United Kingdom Application No. 1912496.5, dated Mar. 10, 2022, 5 pages.
Great Britain Office Action from Great Britain Application No. 2211038.1, dated Aug. 12, 2022, 4 pages.
H Sun and M. Leu, "An Efficient Authentication Scheme for Access Control in Mobile Pay-TV Systems," Aug. 2009 in IEEE Transactions on Multimedia, vol. 11, No. 5, pp. 947-959.
"Getting Started with iBeacon—Version 1.0," Jun. 2, 2014, retrieved from https://developer.apple.com/ibeacon/Getting-Started-with-iBeacon.pdf, 11 pages.
International Search Report and Written Opinion from PCT/US2018/020322, dated Jun. 28, 2018, 11 pages.
Japanese Office Action from Japanese Patent Application No. 2019-547495, dated Nov. 5, 2020, 3 pages including English language translation.
Korean Office Action from Korean Patent Application No. 10-2019-7025603, dated Jan. 5, 2021, 10 pages including English language summary.
Chinese Office Action from Chinese Patent Application No. 2018800154896, dated Aug. 20, 2021, 21 pages including machine-generated English language translation.
Korean Office Action from Korean Patent Application No. 20197025603, dated Aug. 13, 2021, 13 pages including machine-generated English language translation.
Korean Office Action from Korean Patent Application No. 20197025603, dated Nov. 1, 2021, 9 pages including machine-generated English language translation.
Korean Notice Of Allowance from Korean Patent Application No. 10-2021-7039670, dated Aug. 1, 2022, 4 pages including English language translation.

* cited by examiner

PAYMENT HANDOFF SYSTEM

CROSS-REFERENCE TO RELATED APPLICATIONS

The present application is a divisional of U.S. patent application Ser. No. 15/922,795, entitled "Payment Handoff System," filed on Mar. 15, 2018, which claims the benefit of U.S. Provisional Patent Application Ser. No. 62/472,167, entitled "Payment Handoff System," filed on Mar. 16, 2017, each of which is hereby incorporated by reference in its entirety for all purposes.

TECHNICAL FIELD

The present description relates generally to a handoff system, including a payment transaction handoff system.

BACKGROUND

In an electronic payment system, a user having an account with the payment system may perform payment transactions using one or more devices that are registered to the user's account. In some circumstances, a device associated with a user account may not be able to complete a transaction, e.g., because the device lacks hardware and/or software required to perform the transaction. In such circumstances, a user will need to either forgo the transaction or use another device associated with the user account to perform the transaction. For example, a transaction can be initiated on one device associated with a user account and then completed on another device associated with the same user account. Accordingly, a single user account can be accessed from multiple associated devices.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
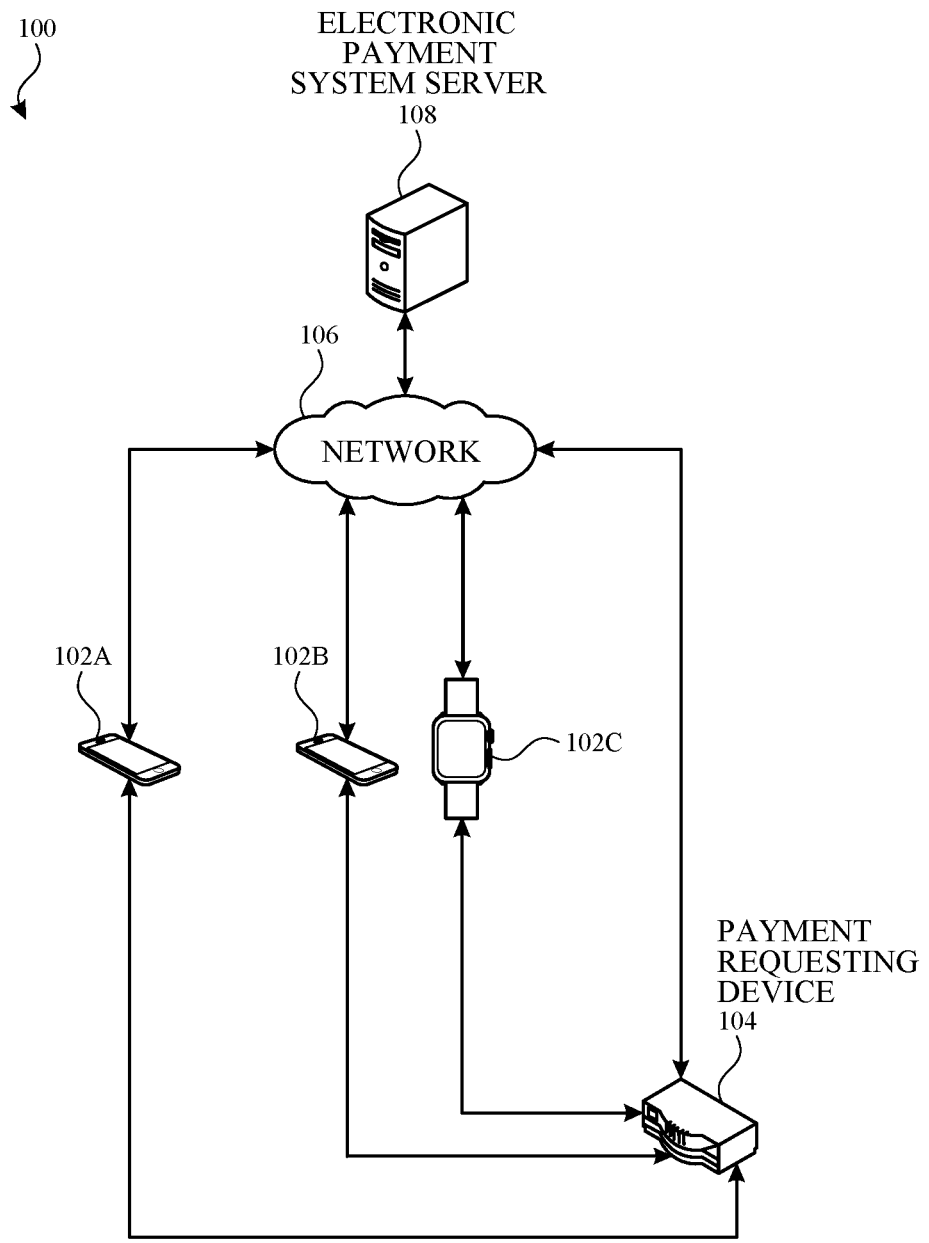
FIG. 1 illustrates an example network environment for a payment handoff system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic payment systems may allow a user to handoff a payment transaction from one device registered to the user's account to another device registered to the user's account. However, there may be instances when a user would like to hand off a payment transaction from a device registered to their account to a device registered to another user's account. For example, if a user has guests visiting, one of the guests may wish to use a device registered to their own account to pay for content, such as a movie, to be viewed on a content aggregation device, and/or a content viewing device, registered to the user's account. In this instance, the device registered to the user would need to handoff a payment transaction to the device registered to the guest such that the guest can pay for the content through their account. If there are multiple guest devices that are proximate to the content aggregation device registered to the user, the content aggregation device would need to determine which of the guest devices to handoff the payment transaction to, if any.

In the subject payment handoff system, a payment requesting device, such as a content aggregation device, may receive a request to perform a payment transaction associated with commerce being conducted through the payment requesting device, such as ordering a movie or purchasing a product/service. The payment requesting device may identify, using a first communication protocol, such as a Bluetooth low energy communication protocol, one or more proximate devices that are capable of performing the payment transaction. The payment requesting device may select one of the identified proximate devices to be the default payment device for the payment transaction based on one or more payment factors. The one or more payment factors may be related to, for example, one or more attributes of the commerce being conducted through the payment requesting device and/or one or more attributes associated with the individual proximate devices.

The payment requesting device may then transmit a message to the default payment device to facilitate performing the payment transaction via a second communication protocol, such as cellular communication protocol or a Wi-Fi communication protocol. In one or more implementations, the second communication protocol may be more robust and/or may be associated with a higher quality of service than the first communication protocol. The default payment device may perform the payment transaction via the second communication protocol, such as with an electronic payment system, and the commerce may be completed through the payment requesting device, such as by providing access to the requested content. Thus, the subject system allows payment transactions to be handed off between devices that may be registered to different users, and the subject system facilitates selecting a proximate device to handoff a payment transaction to when there are multiple proximate devices capable of performing the payment transaction.

FIG. 1 illustrates an example network environment 100 for a payment handoff system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-C, a payment requesting device 104, a network 106, and an electronic payment system server 108. The network 106 may communicatively (directly or indirectly) couple, for example, any two or more of the electronic devices 102A-C, the payment requesting device 104, and/or the electronic payment system server 108. In one or more implementations, the network 106 may be an interconnected network of devices that may include, or may be communicatively coupled to, the Internet. For explanatory purposes, the network environment 100 is illustrated in FIG. 1 as including three electronic devices 102A-C, a single payment requesting device 104, and a single electronic payment system server 108; however, the network environment 100 may include any number of electronic devices, payment requesting devices, and/or electronic payment system servers.

One or more of the electronic devices 102A-C may be, for example, a portable computing device such as a laptop computer, a smartphone, a peripheral device (e.g., a digital camera, headphones), a content aggregation device, a smart television device, a tablet device, a wearable device such as a watch, a band, and the like, or any other appropriate device that includes, for example, one or more wireless interfaces, such as wireless local area network (WLAN) radios, Wi-Fi radios, cellular radios, Bluetooth radios, Zigbee radios, near field communication (NFC) radios, and/or other wireless radios. In FIG. 1, by way of example, the electronic devices 102A-B are depicted as mobile devices and the electronic device 102C is depicted as a smartwatch. The electronic devices 102A-C may be referred to as payment providing devices, and the electronic devices 102A-C may be, and/or may include all or part of, the electronic device discussed below with respect to FIG. 2, and/or the electronic system discussed below with respect to FIG. 6.

The payment requesting device 104 may be, for example, a computing device, such as a laptop, a content aggregation device, such as a set-top box, a virtual personal assistant device, a content presentation device, such as a smart television, a service/product/content purchasing device, such as a voice-activated purchasing device, a wireless payment terminal, such as a wireless transit payment terminal, a wireless toll payment terminal, a wireless parking meter payment terminal, or a wireless point of sale payment terminal, and/or any device that may request a payment transaction, such as any device that includes one or more wireless interfaces, such as NFC radios, WLAN radios, Wi-Fi radios, Bluetooth radios, Zigbee radios, cellular radios, and/or other wireless radios. In FIG. 1, by way of example, the payment requesting device 104 is depicted as a content aggregation device, such as a set-top box. The payment requesting device 104 may be, and/or may include all or part of, the electronic system discussed below with respect to FIG. 6. In one or more implementations, the payment requesting device 104 may be one or more of the electronic devices 102A-C.

One or more of the electronic devices 102A-C may directly communicate with the payment requesting device 104, and/or each other, via a first communication protocol, such as via a Bluetooth low energy (BLE) communication protocol or an NFC protocol that bypasses the network 106.

In one or more implementations, the first communication protocol may be a peer-to-peer communication protocol and/or may be associated with local area network communications. Further, the first communication protocol can be characterized by any/all of relatively low energy communications, low overhead, low latency, etc. In one or more implementations, one or more of the electronic devices 102A-B may communicate with the electronic payment system server 108, and/or the payment requesting device 104, over the network 106 via a second communication protocol, such as a Wi-Fi communication protocol, a cellular communication protocol, an Ethernet communication protocol, or the like. In one or more implementations, the second communication protocol may be a client/server communication protocol and/or may be associated with wide area network communications.

The one or more electronic payment system servers 108 may include one or more servers that facilitate providing an electronic payment system to one or more of the electronic devices 102A-C, and/or the payment requesting device 104. In one or more implementations, the one or more electronic payment system servers 108 may be and/or may include a secure mobile platform. For example, the one or more electronic payment system servers 108 may include one or more trusted services manager (TSM) servers, one or more broker servers, one or more application servers, and/or generally any servers that may facilitate providing an electronic payment system.

In one or more implementations, one or more of the electronic devices 102A-C and/or the payment requesting device 104 may be registered to an account of a user of the electronic payment system. The registration to the account of the user may allow the one or more electronic devices 102A-C and/or the payment requesting device 104, to be used to perform payment transactions via the electronic payment system. One or more of the electronic devices 102A-C and/or the payment requesting device 104 may be registered with an account of the same user and/or one or more of the electronic devices 102A-C may be registered with a different account than the payment requesting device 104.

In the subject payment handoff system, the payment requesting device 104 receives a request to perform a payment transaction, e.g., a payment transaction associated with commerce being conducted through the payment requesting device 104. When the request to perform the payment transaction is received (or generally at any other time), the payment requesting device 104 may transmit a broadcast message (e.g., a beacon and/or advertisement message) using the first communication protocol (e.g., BLE) to identify the presence of the electronic devices 102A-C that are within an effective communication range (e.g., proximal/proximate). The electronic devices 102A-C that are proximate to the payment requesting device 104 and/or capable of performing a payment transaction, may respond by transmitting a message, via the first communication protocol, that includes a device identifier for communicating with the proximate device over the second communication protocol (e.g., Wi-Fi, cellular, etc.). The device identifier may be, for example, an identifier that can be used to communicate with the proximate device via a server-based secure messaging system provided by the electronic payment system server 108. In one or more implementations, one or more of the electronic devices 102A-C may have been previously paired with the payment requesting device 104 for communication via the first communication protocol.

Upon receipt of the device identifiers of the proximate electronic devices 102A-C, the payment requesting device 104 may select one of the electronic devices 102A-C to be the default payment device for the payment transaction. The default payment device may be selected, for example, based on a determination of which of the one or more electronic devices 102A-C is most likely to perform, and/or is most suitable to perform, the payment transaction, such as based on one or more payment factors. The one or more payment factors may be related to, for example, the commerce being conducted through the payment requesting device 104 and/or one or more attributes associated with one or more of the electronic devices 102A-C.

The payment requesting device 104 provides, via the second communication protocol, an address associated with the default payment device to the electronic payment system server 108 for conducting the payment transaction directly with the electronic device 102A via the second communication protocol, and/or the payment requesting device 104 transmits a message addressed to the electronic device 102A via the second communication protocol that allows the electronic device 102A to initiate the payment transaction directly with the electronic payment system server 108 via the second communication protocol, thereby effectively handing off the payment transaction to the electronic device 102A.

The electronic device 102A device may perform the payment transaction directly with the electronic payment system server 108 via the second communication protocol. In one or more implementations, the electronic payment system server 108 may notify the payment requesting device 104 via the second communication protocol when the payment transaction has been performed, e.g., by the electronic device 102A or by another of the electronic devices 102B-C. In this regard, if the electronic device 102A does not wish to perform the payment transaction, the electronic device 102A may initiate a hand off of the payment transaction to another of the electronic devices 102B-C, such as via a user interface of the electronic device 102A and/or via a user interface of the payment requesting device 104. An example process of handing off a payment transaction by a payment requesting device 104 is discussed further below with respect to FIG. 3.

In one or more implementations, the broadcast message transmitted by the payment requesting device 104 (and/or a subsequently transmitted message) may include one or more attributes and/or requirements of the payment transaction being requested, such as attributes identifying the merchant associated with the payment transaction, the item or service associated with the payment transaction, a type of payment required for the payment transaction, or generally any attributes or requirements associated with the payment transaction. One or more of the electronic devices 102A-C may receive the one or more attributes and/or requirements, and the one or more electronic devices 102A-C may each generate a suitability score that indicates the suitability of each of the electronic devices 102A-C for performing the payment transaction, e.g. based on the attributes and/or requirements of the payment transaction and/or one or more attributes associated with each of the electronic devices 102A-C. The electronic devices 102A-C may communicate their respective suitability scores back to the payment requesting device 104 via the first communication protocol. The payment requesting device 104 may select the default payment device by determining which of the electronic devices 102A-C is most suitable or most likely to conduct the transaction based at least in part on the provided suitability scores. An example process of calculating a suitability score by an example electronic device 102A is discussed further below with respect to FIG. 4.

In one or more implementations, the subject system may be used to facilitate a chain of payments between multiple of the electronic devices 102A-C, e.g., payment aggregation. In this instance, one of the electronic devices 102A-C, such as the electronic device 102A, may be the payment requesting device, and the electronic device 102A may request that one or more of the other electronic devices 102B-C contribute at least a portion of a payment amount associated with a particular payment transaction. The electronic device 102A may transmit a broadcast message via the first communication protocol (e.g., BLE) to initiate the payment aggregation in similar manner as discussed above with respect to handing off a payment transaction. One or more of the other electronic devices 102B-C may contribute a portion of the payment for the payment transaction to the electronic device 102A via the second communication protocol and by way of the electronic payment system server 108. Once the electronic device 102A has received the portions of the payment amount from the other electronic devices 102B-C, the electronic device 102A may complete the payment transaction, e.g., using the second communication protocol and by way of the electronic payment system server 108. An example process for payment aggregation is discussed further below with respect to FIG. 5.

Figure 2:
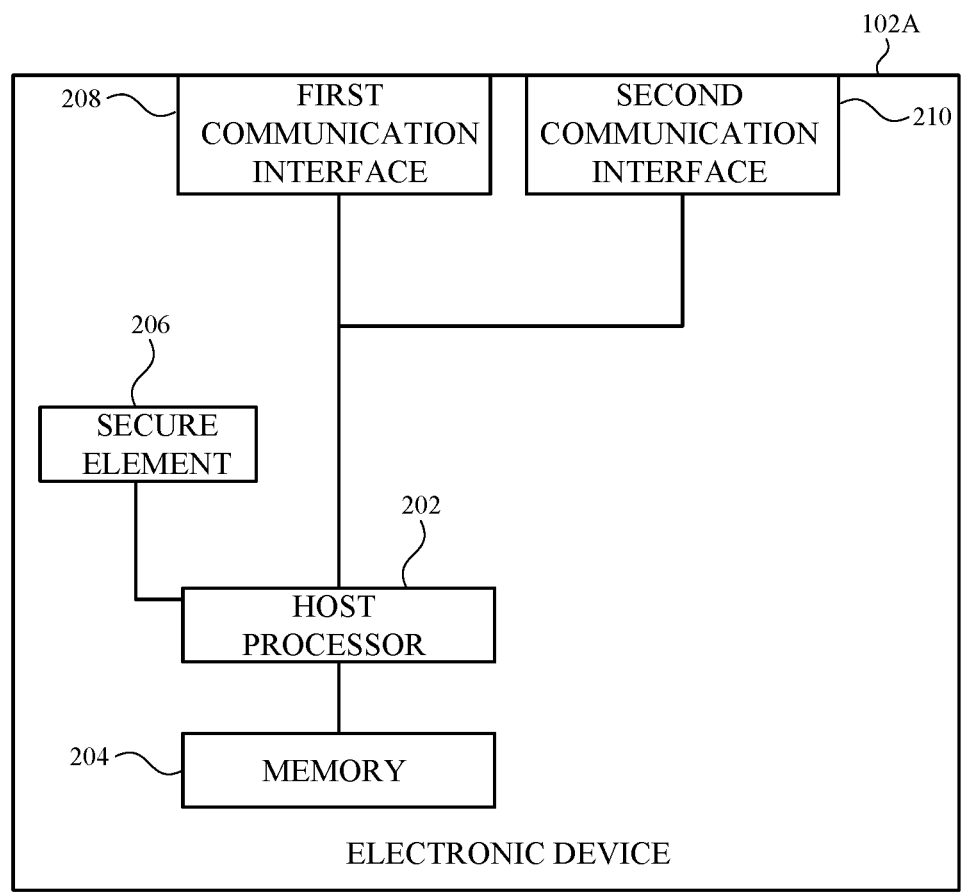
FIG. 2 illustrates an example electronic device that may be used in a payment handoff system in accordance with one or more implementations.

FIG. 2 illustrates an example electronic device 102A that may be used in a payment handoff system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, one or more components of the example electronic device 102A may be implemented by one or more the electronic devices 102B-C and/or the payment requesting device 104.

The electronic device 102A may include, among other components, a host processor 202, a memory 204, a secure element 206, a first communication interface 208 and a second communication interface 210. The secure element 206 may include, for example, a secure processor, RAM, a security engine, an interface, and/or non-volatile memory. The secure element 206 may be used by the host processor 202 to perform payment transactions, such as with the electronic payment system server 108. The host processor 202, which may also be referred to as an application processor or a processor, may include suitable logic, circuitry, and/or code that enable processing data and/or controlling operations of the electronic device 102A. In this regard, the host processor 202 may be enabled to provide control signals to various other components of the electronic device 102A.

The host processor 202 may also control transfers of data between various portions of the electronic device 102A. Additionally, the host processor 202 may enable implementation of an operating system or otherwise execute code to manage operations of the electronic device 102A. The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The first communication interface 208 may be used by the host processor 202 to communicate via a first communication protocol, such as BLE or NFC, and the second communication interface 210 may be used by the host processor 202 to communicate via a second communication protocol, such as Wi-Fi, cellular, Ethernet, or the like. In one or more implementations, the first communication interface 208 may be, may include, and/or may be communicatively coupled to a first radio frequency (RF) circuit, such as a Bluetooth circuit and/or an NFC circuit, and the second communication interface 210 may be, may include, and/or may be communicatively coupled to a second RF circuit, such as a WLAN circuit, a cellular RF circuit, or the like. In one or more implementations, the first communication interface 208 may include all or part of the second communication interface 210.

In one or more implementations, one or more of the host processor 202, the memory 204, the secure element 206, the first communication interface 208, the second communication interface 210, and/or one or more portions thereof, may be implemented in software (e.g., subroutines and code), hardware (e.g., an ASIC, an FPGA, a PLD, a controller, a state machine, gated logic, discrete hardware components, or any other suitable devices) and/or a combination of both.

Figure 3:
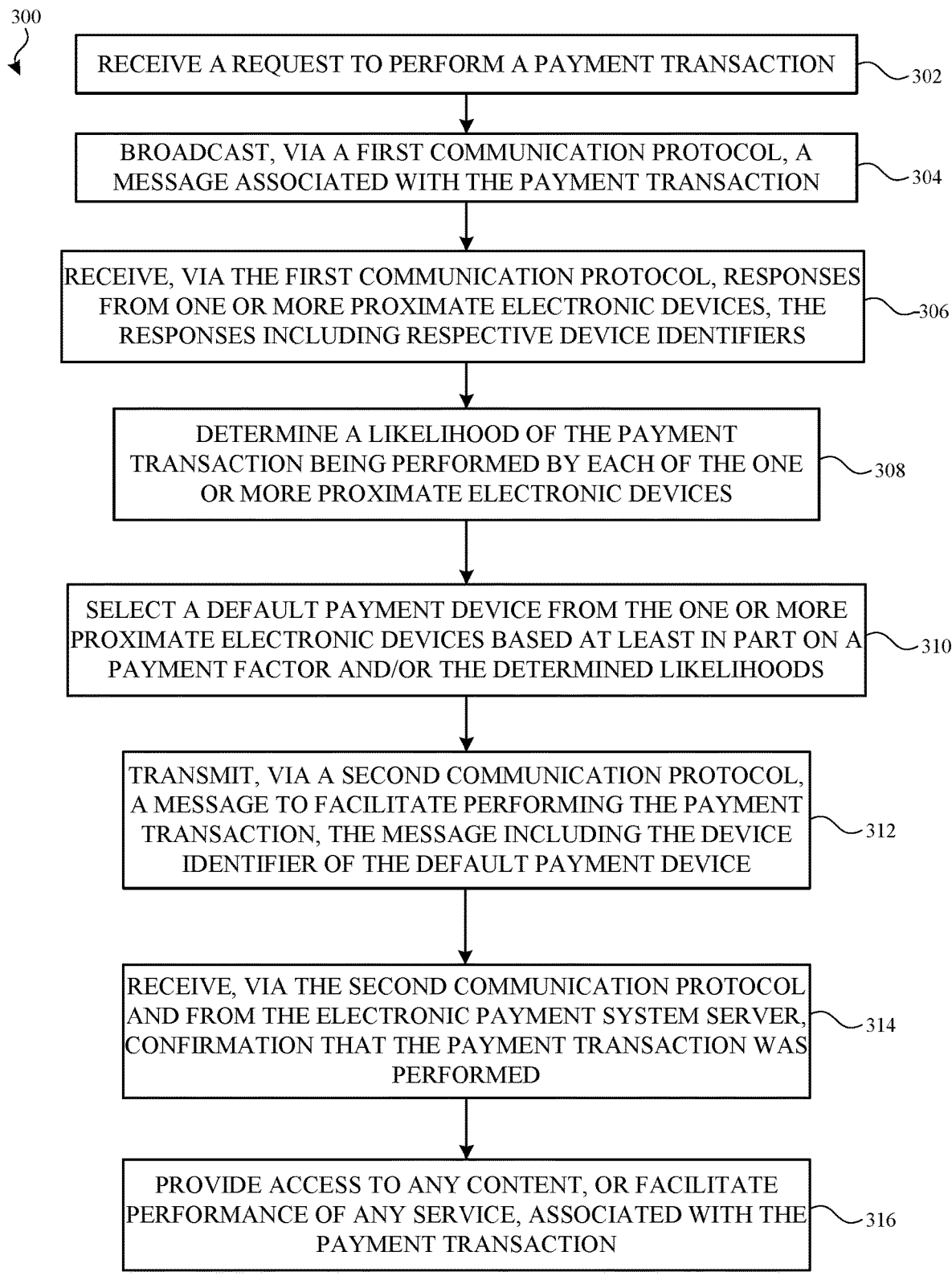
FIG. 3 illustrates a flow diagram of an example process of a payment requesting device in accordance with one or more implementations.

FIG. 3 illustrates a flow diagram of an example process 300 of a payment requesting device 104 in accordance with one or more implementations. For explanatory purposes, the process 300 is primarily described herein with reference to the payment requesting device 104 of FIG. 1. However, the process 300 is not limited to the payment requesting device 104 of FIG. 1, and one or more blocks (or operations) of the process 300 may be performed by one or more components or chips of the payment requesting device 104. The payment requesting device 104 is also presented as an exemplary device and the operations described herein may be performed by any suitable device, such as one or more of the electronic devices 102A-C. Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

The process 300 may be initiated when the payment requesting device 104, such as a content aggregation device, receives a request to perform a payment transaction (302). For example, the payment requesting device 104 may receive a request to rent/purchase a movie that requires a payment transaction to be performed for a payment amount, e.g., the rental or purchase cost. In one or more implementations, the request may be received as a voice command and/or the request may be received through a device communicatively coupled to the payment requesting device 104, such as a remote control. In response to the request, the payment requesting device 104 broadcasts, via the first communication protocol (such as BLE), a message associated with the payment transaction (304). The message may be, for example, an advertisement or beacon message that may request that any proximate electronic devices 102A-C respond with their current device identifiers for communicating via the second communication protocol, such as Wi-Fi or cellular. In one or more implementations, the device identifiers may change over time. In one or more implementations, the payment requesting device 104 may continually poll the proximate electronic devices 102A-C, such as on a periodic or a periodic basis, to continuously identify which of the electronic devices 102A-C are available when a request for a payment transaction occurs.

In one or more implementations, the message may further include one or more attributes of the payment transaction, such as a merchant identifier, a content identifier or descriptor, any payment requirements (e.g. a particular type of credit card), and/or any other information that may facilitate a determination by the respective electronic devices 102A-C as to whether they are suitable for performing the payment transaction. One or more of the electronic devices 102A-C, such as the electronic device 102A, may receive the one or more attributes of the payment transaction and may determine a suitability of the electronic device 102A for performing the payment transaction, e.g., based at least in part on the one or more attributes of the payment transaction and/or one or more attributes associated with the electronic device 102A. The one or more attributes associated with the electronic device 102A may include, for example, a purchase history associated with the electronic device 102A, whether the electronic device 102A is registered to the user that initiated the payment transaction, a proximity of the electronic device 102A to the payment requesting device 104 and/or one or more devices communicatively coupled thereto, such as a remote control, and/or generally any other information that may be indicative of a suitability of the electronic device 102A for performing the payment transaction and/or a likelihood thereof. The determined suitability of the electronic device 102A for performing the payment transaction may be conveyed via a suitability score, such as the suitability score that is discussed further below with respect to FIG. 4.

The payment requesting device 104 receives, via the first communication protocol, one or more responses from one or more of the proximate electronic devices 102A-C that include respective device identifiers for communicating with the respective electronic devices 102A-C via the second communication protocol (306). In one or more implementations, the responses may further include respective indications of the suitability of the respective electronic devices 102A-C to perform the payment transaction, such as the suitability scores that are discussed further below with respect to FIG. 4. The payment requesting device 104 determines a likelihood of the payment transaction being performed by each of the one or more proximate electronic devices 102A-C that provided responses to the broadcasted message (308).

For example, if the electronic device 102A provided a suitability score with their response to the broadcast message (or in a subsequent message), the payment requesting device 104 may use the suitability score as an indication of the likelihood of the electronic device 102A performing the payment transaction. If one or more of the electronic devices 102A-C, such as the electronic device 102A, did not provide a suitability score, the payment requesting device 104 may determine the likelihood of the payment transaction being performed by the electronic device 102A based on one or more attributes of the electronic device 102A, one or more attributes of the payment transaction, and/or the likelihoods of the other electronic devices 102B-C performing the payment transaction.

For example, the payment requesting device may have access, e.g. locally and/or via the second communication protocol, to information regarding available payment methods at the electronic device 102A, a purchase history associated with the electronic device 102A, and/or any other information regarding the electronic device 102A. In one or more implementations, the payment requesting device 104 may obtain the purchase history and/or other attributes of the proximate electronic devices 102A-C from the electronic payment system server 108, e.g. based on the device identifiers of the proximate devices, and/or the payment requesting device 104 may obtain the purchase history and/or other attributes directly from the proximate electronic devices 102A-C by using the device identifiers to communicate with the proximate electronic devices 102A-C via the first and/or second communication protocols. In one or more implementations, the payment requesting device 104 may also be able to determine a proximity of the electronic device 102A to the payment requesting device 104 and/or to a device communicatively coupled to the payment requesting device 104, e.g., a remote control, such as via room mapping technology, time of flight measurements, or the like.

The payment requesting device 104 selects a default payment device for the payment transaction from the one or more proximate electronic devices 102A-C that provided a response to the broadcast message (310). The selection may be based at least in part on likelihoods determined for the electronic devices 102A-C, suitability scores received from the electronic devices 102A-C, and/or a payment factor. The payment factor may indicate, for example, that the one of the electronic devices 102A-C that has the highest likelihood of performing the transaction, and/or that is most suitable for performing the transaction, should be selected as the default payment device. In one or more implementations, the payment factor may indicate one of the electronic devices 102A-C to be selected as the default payment device independent of the determined likelihoods and/or suitability scores.

For example, when the request to perform the payment transaction is received via a voice command, the payment factor may indicate that the one of the electronic devices 102A-C that is physically located closest to the device through which the voice command was received, such as a remote control, a charging device, the payment requesting device 104, or the like, should be selected as the default payment device. In one or more implementations, the source of the voice command may be mapped to a location in the room and the one of the electronic devices 102A-C that is physically located closest to the source of the voice command may be selected as the default payment device. In one or more implementations, the user that provided the voice command may be identified, such as via voice recognition, and the one of the electronic devices 102A-C that is registered to the account of the user that provided the voice command may be selected as the default payment device.

Upon selecting the default payment device, such as the electronic device 102A, the payment requesting device 104 transmits, via the second communication protocol, a message to facilitate performing the payment transaction, where the message includes the device identifier of the default payment device (312). For example, the payment requesting device 104 may transmit, via the second communication protocol, the message to the electronic payment system server 108 with the device identifier in the body of the message and/or information regarding the payment transaction in the body of the message, such as a payment transaction identifier. The electronic payment system server 108 may then initiate, via the second communication protocol, the payment transaction with the electronic device 102A.

In one or more implementations, the payment requesting device 104 may transmit a message to the electronic device 102A that includes the device identifier of the electronic device 102A in a destination address of the message, or in a similar field that facilitates delivering the message to the electronic device 102A. The message may further include information regarding the payment transaction and/or the electronic payment system server 108. The electronic device 102A may utilize the received message to initiate the payment transaction with the electronic payment system server 108 via the second communication protocol. For example, the message may include an element, such as a link or graphical indicator, that initiates the payment when selected. In one or more implementations, the electronic device 102A may handoff the payment transaction to another of the electronic devices 102B-C, as is discussed further below with respect to FIG. 4.

The payment requesting device 104 receives, via the second communication protocol and from the electronic payment system server 108, confirmation that the payment transaction was performed (314). The confirmation may further indicate that the payment transaction was performed by the electronic device 102A and/or that the payment transaction was handed off and performed by another of the electronic devices 102B-C. In one or more implementations, if the payment requesting device 104 does not receive the confirmation after a predetermined amount of time, the payment requesting device 104 may cancel the payment transaction and/or may handoff the payment transaction to another of the electronic devices 102B-C, such as based on the determined likelihoods, suitability scores, and/or the one or more payment factors.

Upon receiving confirmation that the payment transaction was performed (314), the payment requesting device 104 completes the commerce being conducted through the payment requesting device 104, such as by providing access to any content associated with the payment transaction, such as a movie, facilitating performance of any service associated with the payment transaction, and/or completing the purchase of any item associated with the payment transaction (316).

Figure 4:
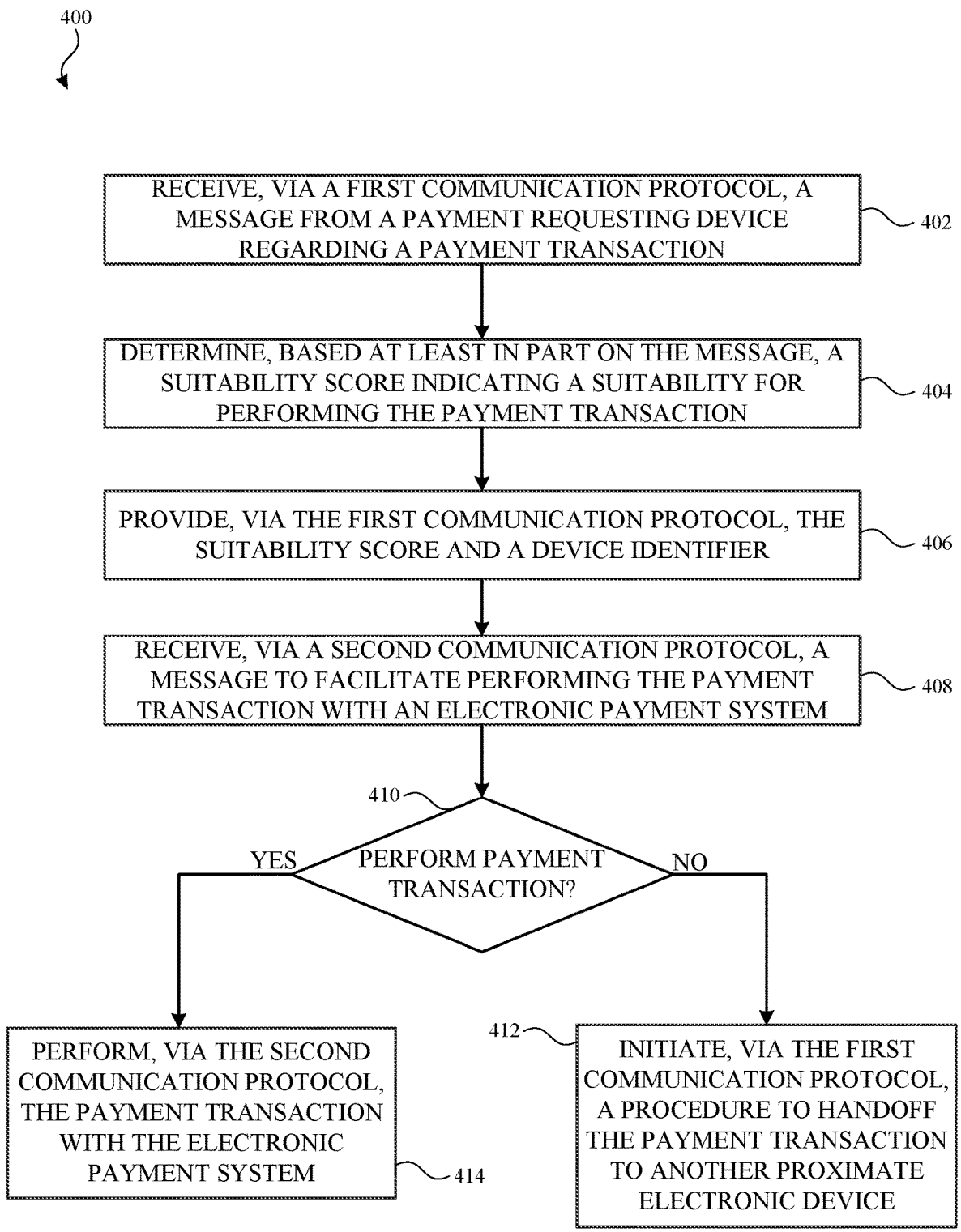
FIG. 4 illustrates a flow diagram of an example process of an electronic device performing a payment transaction in accordance with one or more implementations.

FIG. 4 illustrates a flow diagram of an example process 400 of an electronic device 102A performing a payment transaction in accordance with one or more implementations. For explanatory purposes, the process 400 is primarily described herein with reference to the electronic device 102A of FIGS. 1-2. However, the process 400 is not limited to the electronic device 102A of FIGS. 1-2, and one or more blocks (or operations) of the process 400 may be performed by one or more other components or chips of the electronic device 102A. The electronic device 102A also is presented as an exemplary device and the operations described herein may be performed by any suitable device, such as one or more of the electronic devices 102B-C, and/or the payment requesting device 104. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The process 400 may be initiated when the electronic device 102A receives, via the first communication protocol (e.g., BLE), a message from a payment requesting device 104 regarding a payment transaction (402). The message may be, for example, a broadcast or beacon message. The message may request that the electronic device 102A respond with a device identifier for communicating with the electronic device over the second communication protocol (e.g. cellular, Wi-Fi, etc.). In one or more implementations, the message (or a subsequent message) may further include information regarding the payment transaction, such as information identifying a merchant associated with the payment transaction, any payment requirements associated with the payment transaction, and/or information describing a content, service, and/or item associated with the payment transaction.

The electronic device 102A determines, based at least in part on the received message, a suitability score indicating a suitability of the electronic device 102A for performing the payment transaction (404). For example, if the electronic device 102A is not able to perform the payment transaction, e.g., because the electronic device 102A does not include the required components (e.g., a secure element), the electronic device 102A may determine a suitability score of 0, or of some other value that indicates that the electronic device 102A is not suitable for performing the payment transaction. If the electronic device 102A is able to perform the payment transaction, and the message does not include any attributes regarding the payment transaction, the suitability score may be set to 1, 100, or to some other value that indicates that the electronic device 102A is highly suitable for performing the payment transaction.

In one or more implementations, when the message includes one or more attributes and/or requirements of the payment transaction, the suitability score may be determined based on the one or more attributes and/or requirements of the payment transaction as well as one or more attributes and/or characteristics associated with the electronic device 102A. For example, if the payment transaction requires a certain form of payment or a registered account that is not available on the electronic device 102A, the electronic device 102A may determine a low suitability score, such as 0. The suitability score may also be determined based on a comparison between the purchase history associated with the electronic device 102A (e.g. merchant history and/or content history) and the content/service/item and/or merchant associated with the payment transaction. For example, if the electronic device 102A has multiple purchases with the merchant associated with the payment transaction, or multiple purchases of the item/class of goods associated with the payment transaction, the electronic device 102A may generate a high suitability score.

In one or more implementations, other attributes of the purchase history may also be compared to the attributes of the payment transaction, such as a time of day associated with prior purchases as compared to a current time of day, a day of the week associated with prior purchases as compared to a current day of the week, a location of the electronic device 102A when prior purchases are made as compared to a current location, an average amount of the prior purchases as compared to an amount of the payment transaction, a number of times that the electronic device 102A has provided payments for transactions being conducted on the payment requesting device 104, and/or the like.

In one or more implementations, the suitability score may be determined based on user activity data and/or user behavioral data available at the electronic device 102A. For example, if biometric/activity data of a user associated with the electronic device 102A indicates that the user is sleeping, the electronic device 102A may generate a low suitability score for the payment transaction. In some implementations, multiple factors can be evaluated in generating the suitability score, and in some implementations, one or more of the factors can be weighted.

The electronic device 102A provides, via the first communication protocol, the suitability score to the payment requesting device 104, as well as a device identifier for communicating with the electronic device 102A via the second communication protocol (406). When the payment requesting device 104 selects the electronic device 102A as the default payment device, the electronic device 102A receives, via the second communication protocol, a message to facilitate performing the payment transaction with the electronic payment system server 108 via the second communication protocol (408). The message may be addressed to the electronic device 102A based at least in part on the device identifier provided to the payment requesting device 104.

The electronic device 102A determines whether it will perform the payment transaction (410). Since the electronic device 102A may have been selected by the payment requesting device 104 without user input, in one or more implementations, the electronic device 102A may not perform the payment transaction. For example, the electronic device 102A may provide the received message (or an indication thereof) for display and may receive, responsive thereto, an indication, e.g., from a user, that the electronic device 102A will not perform the payment transaction. In one or more implementations, the payment requesting device 104 may receive the indication that the electronic device 102A will not perform the payment transaction, such as from a user.

When the electronic device 102A determines that it will not perform the payment transaction (410), the electronic device 102A initiates, via the first communication protocol, a procedure to handoff the payment transaction to one of the other proximate electronic devices 102B-C (412). For example, the electronic device 102A may perform one or more of the operations of the process 300 to handoff the payment transaction to another of the electronic devices 102B-C. In one or more implementations, the electronic device 102A and/or the payment requesting device 104, may display an indication of the other proximate electronic devices 102B-C, and the electronic device 102A and/or the payment requesting device 104 may receive a selection of another of the electronic devices 102B-C to handoff the payment transaction to.

When the electronic device 102A determines that it will perform the payment transaction (410), such as based on receiving a request or approval to initiate the payment transaction, the electronic device 102A performs, via the second communication protocol, the payment transaction with the electronic payment system server 108 (414). For example, the electronic device 102A may utilize the secure element 206 and/or an applet stored thereon, to perform the payment transaction with the electronic payment system server 108 via the second communication protocol.

Figure 5:
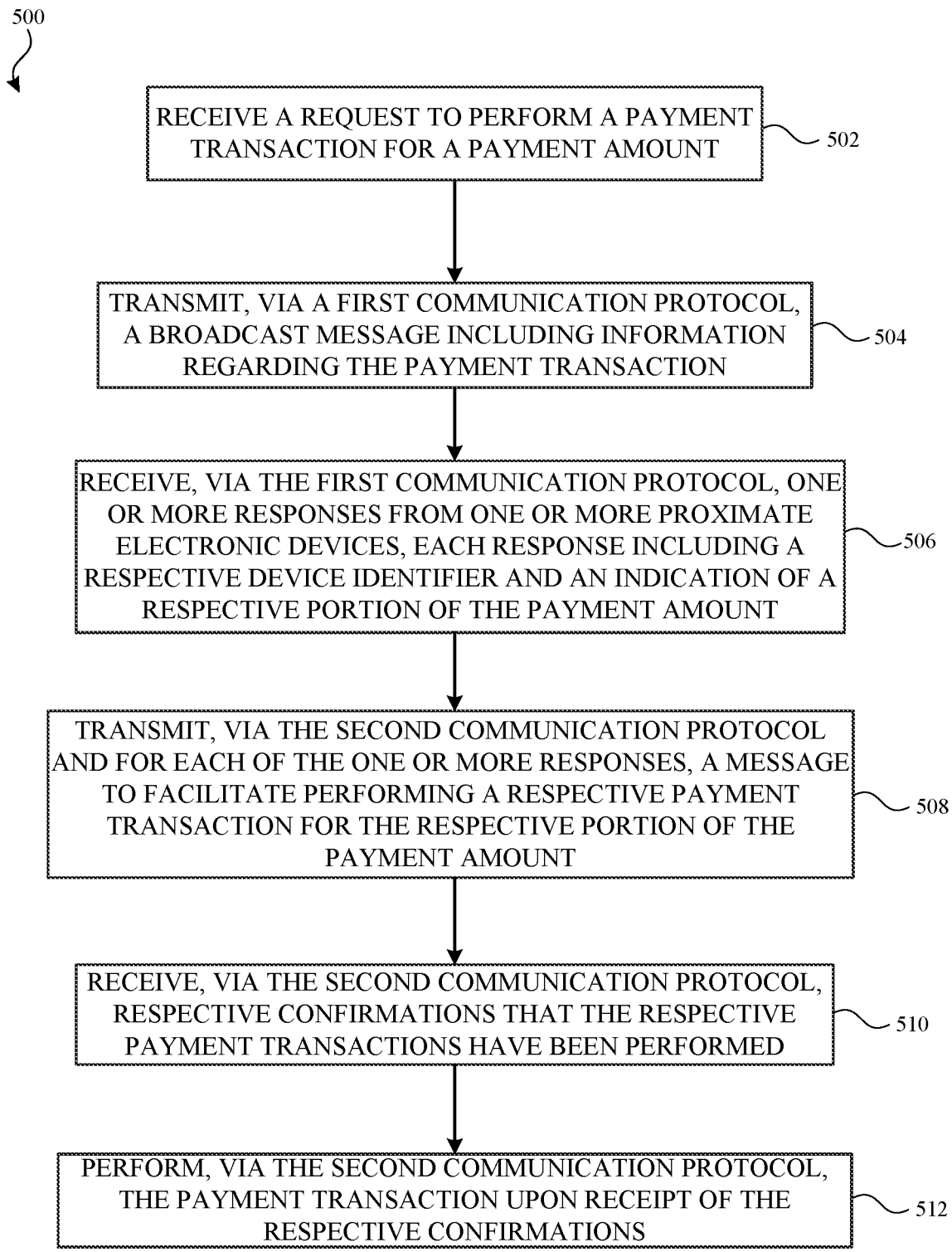
FIG. 5 illustrates a flow diagram of an example process of payment aggregation in accordance with one or more implementations.

FIG. 5 illustrates a flow diagram of an example process 500 of payment aggregation in accordance with one or more implementations. For explanatory purposes, the process 500 is primarily described herein with reference to the electronic device 102A of FIGS. 1-2. However, the process 500 is not limited to the electronic device 102A of FIGS. 1-2, and one or more blocks (or operations) of the process 500 may be performed by one or more other components or chips of the electronic device 102A. The electronic device 102A also is presented as an exemplary device and the operations described herein may be performed by any suitable device, such as one or more of the electronic devices 102B-C, and/or the payment requesting device 104. Further for explanatory purposes, the blocks of the process 500 are described herein as occurring in serial, or linearly. However, multiple blocks of the process 500 may occur in parallel. In addition, the blocks of the process 400 need not be performed in the order shown and/or one or more blocks of the process 500 need not be performed and/or can be replaced by other operations.

The process 500 may be initiated when the electronic device 102A receives a request to perform a payment transaction for a payment amount (502). For example, the electronic device 102A may receive a request to purchase content, such as order a movie, purchase an item/service, such as pizza delivery, or the like. The electronic device 102A transmits, via the first communication protocol (e.g., BLE), a broadcast message including information regarding the payment transaction (504). The information regarding the payment transaction may include one or more attributes of the merchant, one or more attributes of a user associated with the electronic device 102A, one or more attributes of the item/content/service being purchased and/or the payment amount of the payment transaction.

The electronic device 102A receives, via the first communication protocol, one or more responses from one or more proximate electronic devices 102B-C (506). For example, a response received from the electronic device 102B may include a device identifier for communicating with the electronic device 102B via the second communication protocol, as well as an indication of a portion of the payment amount that will be contributed by a payment transaction performed by the electronic device 102B. The electronic device 102A transmits, via the second communication protocol and for each of the one or more responses, a message to perform a respective payment transaction for the respective portion of the payment amount indicated in each respective response (508). In one or more implementations, each message may be transmitted to the respective one of the electronic devices 102B-C using the respective device identifier provided in the respective responses.

The electronic device 102A receives, via the second communication protocol, respective confirmations that the respective payment transactions have been performed with the electronic payment system server 108 by the electronic devices 102B-C via the second communication protocol (510). For example, the payment transaction for the electronic device 102B may result in the portion of the payment amount indicated in the response from the electronic device 102B being deducted from an account to which the electronic device 102B is registered, and deposited into an account to which the electronic device 102A is registered. In one or more implementations, the accounts may each include value associated with a stored value card, where the portion of the payment amount is deducted by the electronic payment system server 108 from a stored value card of the account to which the electronic device 102B is registered, and deposited by the electronic payment system server 108 to a stored value card of the account to which the electronic device 102A is registered.

Upon receiving the confirmations that the respective payment transactions have been performed, the electronic device 102A performs, via the second communication protocol, the initially requested payment transaction (512), such as with the electronic payment system server 108 (512). Thus, the process 500 allows an account to which the electronic device 102A is registered to receive individual portions of the payment amount from the accounts to which the other electronic devices 102B-C are registered. After the individual portions of the payment amount have been deposited into the account to which the electronic device 102A is registered, the electronic device 102A may perform the payment transaction with the electronic payment system server 108 via the second communication protocol using an aggregation of the received portions of the payment amount, as well as any remaining portion of the payment amount which is deducted from the account to which the electronic device 102A is registered.

In one or more implementations, the electronic device 102A may display a user interface that provides the status of the payment aggregation and/or receives commands for controlling/modifying the payment aggregation process. For example, the user interface may display statuses of the transfers of the portions of the payments from the accounts to which the other electronic devices 102B-C are registered to the account to which the electronic device 102A is registered. The user interface may also allow a user to accept/decline/cancel/return respective portions of the payment amount that are offered to be provided the respective electronic devices 102B-C.

Figure 6:
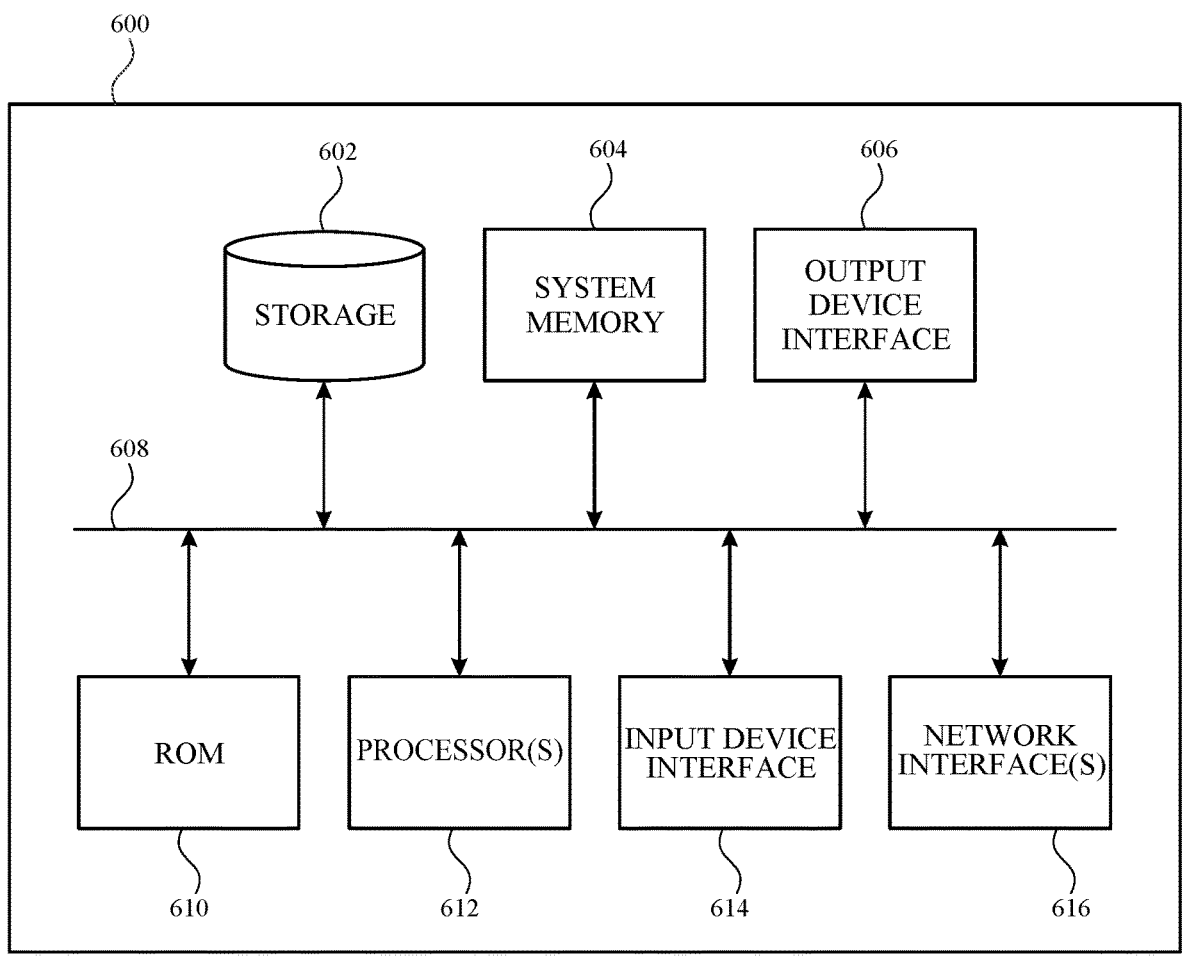
FIG. 6 illustrates an example electronic system with which aspects of the subject technology may be implemented in accordance with one or more implementations.

FIG. 6 illustrates an electronic system 600 with which one or more implementations of the subject technology may be implemented. The electronic system 600 can be, and/or can be a part of, one or more of the electronic devices 102A-C, the payment requesting device 104, and/or the electronic payment system server 108 shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes, through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving, by a device via a first communication protocol, a payment request message from a proximate payment requesting device, wherein the payment request message comprises an attribute of a payment transaction associated with the proximate payment requesting device;
   determining, based at least in part on the attribute of the payment transaction, a likelihood that the device will perform the payment transaction;
   providing, to the proximate payment requesting device via the first communication protocol, a device identifier and an indication of the likelihood that the device will perform the payment transaction;
   receiving, responsive to providing the indication and from the proximate payment requesting device via a second communication protocol different than the first communication protocol, a message to perform the payment transaction with an electronic payment system, the electronic payment system being separate from the proximate payment requesting device, wherein the message to perform the payment transaction is received responsive to a determination of the device at the proximate payment requesting device based at least in part on a payment factor; and
   performing the payment transaction with the electronic payment system via the second communication protocol, or initiating, via the first communication protocol, handing the payment transaction off to an other proximate device.

2. The method of claim 1, wherein the attribute of the payment transaction comprises at least one of: a merchant identifier associated with the payment transaction, information regarding a content or a service associated with the payment transaction, or a payment requirement associated with the payment transaction.

3. The method of claim 2, further comprising:
   calculating a likelihood score based at least in part on the attribute of the payment transaction, the likelihood score indicating the likelihood that the device will perform the payment transaction, wherein the indication provided to the proximate payment requesting device comprises the likelihood score.

4. The method of claim 3, wherein calculating the likelihood score based at least in part on the attribute of the payment transaction comprises:
   calculating the likelihood score based at least in part on the attribute of the payment transaction and an attribute of the device, the attribute of the device comprising at least one of: a purchase history associated with the device, a payment capability associated with the device, information regarding a user associated with the device, or a number of times that the device has performed payment transactions with the electronic payment system on behalf of the proximate payment requesting device.

5. The method of claim 1, wherein the device is associated with a first user account and the proximate payment requesting device is associated with a second user account that is different from the first user account.

6. The method of claim 1, further comprising:
   receiving, from the electronic payment system, confirmation that the payment transaction was completed.

7. The method of claim 1, wherein the payment request message comprises a broadcast message.

8. The method of claim 1, wherein the first communication protocol has a lower quality of service than the second communication protocol.

9. The method of claim 1, wherein the payment transaction is associated with a voice command and the indication of the likelihood of the device to perform the payment transaction is based at least in part on a proximity of the device to a source of the voice command.

10. A system comprising:
a first communication interface configured to communicate via a first communication protocol;
a second communication interface configured to communicate via a second communication protocol; and
at least one processor configured to:
receive a request to perform a payment transaction for a payment amount;
broadcast, using the first communication interface and via the first communication protocol, information regarding the payment transaction;
receive, using the first communication interface and via the first communication protocol, a device identifier of a proximate device and an indication of a portion of the payment amount;
transmit, using the second communication interface and via the second communication protocol, a message to perform an other payment transaction for the portion of the payment amount, the message comprising the device identifier of the proximate device; and
receive, using the second communication interface and via the second communication protocol, confirmation that the other payment transaction for the portion of the payment amount has been performed by the proximate device, wherein the system is associated with a first user account and the proximate device is associated with a second user account, different from the first user account.

11. The system of claim 10, wherein the at least one processor is further configured to:
wait to perform the payment transaction until receipt of the confirmation that the other payment transaction has been performed by the proximate device; and
perform, using the second communication interface and via the second communication protocol, the payment transaction for the payment amount upon receipt of the confirmation that the other payment transaction for the portion of the payment amount has been performed by the proximate device.

12. The system of claim 10, wherein the at least one processor is further configured to:
receive, using the second communication interface and via the second communication protocol, an indication that the portion of the payment amount has been deducted from a first account associated with the proximate device and that the portion of the payment amount has been deposited into a second account associated with the system.

13. A device comprising:
a memory; and
at least one processor configured to:
receive, by the device via a first communication protocol, a payment request message from a proximate payment requesting device, wherein the payment request message comprises an attribute of a payment transaction associated with the proximate payment requesting device;
determine, based at least in part on the attribute of the payment transaction, a likelihood that the device will perform the payment transaction;
provide, to the proximate payment requesting device via the first communication protocol, a device identifier and an indication of the likelihood that the device will perform the payment transaction;
receive, responsive to providing the indication and from the proximate payment requesting device via a second communication protocol, a message to perform the payment transaction with an electronic payment system, the electronic payment system being separate from the payment requesting device, wherein the message to perform the payment transaction is received responsive to a determination of the device at the proximate payment requesting device based at least in part on a payment factor; and
perform the payment transaction with the electronic payment system via the second communication protocol, or initiating, via the first communication protocol, handing the payment transaction off to an other proximate device.

14. The device of claim 13, wherein the attribute of the payment transaction comprises at least one of: a merchant identifier associated with the payment transaction, information regarding a content or a service associated with the payment transaction, or a payment requirement associated with the payment transaction.

15. The device of claim 14, wherein the at least one processor is further configured to:
calculate a likelihood score based at least in part on the attribute of the payment transaction, the likelihood score indicating the likelihood that the device will perform the payment transaction, wherein the indication provided to the proximate payment requesting device comprises the likelihood score.

16. The device of claim 15, wherein the at least one processor is configured to calculate the likelihood score based at least in part on the attribute of the payment transaction by:
calculating the likelihood score based at least in part on the attribute of the payment transaction and an attribute of the device, the attribute of the device comprising at least one of: a purchase history associated with the device, a payment capability associated with the device, information regarding a user associated with the device, or a number of times that the device has performed payment transactions with the electronic payment system on behalf of the proximate payment requesting device.

17. The device of claim 13, wherein the device is associated with a first user account and the proximate payment requesting device is associated with a second user account that is different from the first user account.

18. The device of claim 13, wherein the at least one processor is further configured to:
receive, from the electronic payment system, confirmation that the payment transaction was completed.

19. The device of claim 13, wherein the payment request message comprises a broadcast message.

20. The device of claim 13, wherein the first communication protocol has a lower quality of service than the second communication protocol.

* * * * *